March 22, 1966   H. E. DICKERMAN   3,241,307
TIMEPIECE REGULATING MEANS
Filed Nov. 17, 1961   3 Sheets-Sheet 1

INVENTOR.
HUBERT E. DICKERMAN
BY *Kenwood Ross*
ATTORNEY.

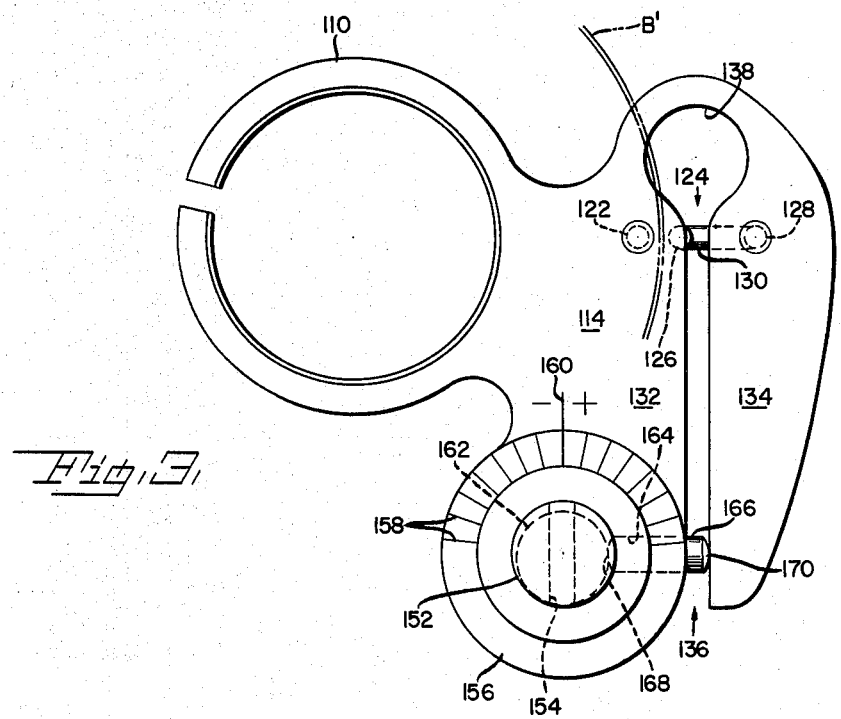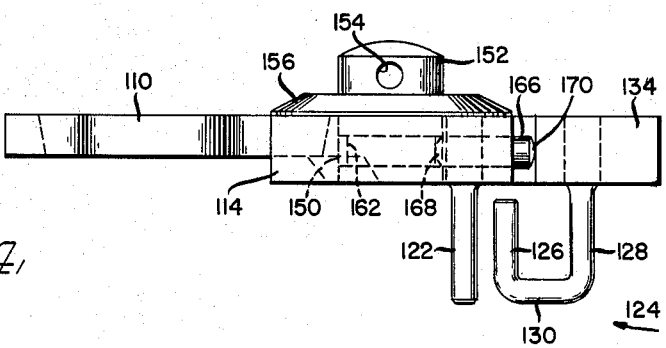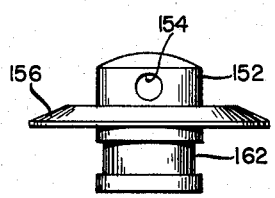

March 22, 1966     H. E. DICKERMAN     3,241,307
TIMEPIECE REGULATING MEANS

Filed Nov. 17, 1961     3 Sheets-Sheet 3

INVENTOR.
HUBERT E. DICKERMAN
BY Kenwood Ross
ATTORNEY.

United States Patent Office 3,241,307
Patented Mar. 22, 1966

3,241,307
TIMEPIECE REGULATING MEANS
Hubert E. Dickerman, 276 Farmington Road,
Longmeadow, Mass.
Filed Nov. 17, 1961, Ser. No. 153,178
3 Claims. (Cl. 58—113)

My invention relates to improvements in means for regulating the mean time rate of a balance wheel and balance spring of a horological instrument and is directed particularly to a means for moving one of a pair of curb or regulator pins toward and away from the other curb or regulator pin of the pair thereof to effectuate extremely fine incremental adjustments of the space between said curb pins so as to regulate effectively the running speed of the said horological instrument.

Heretofore, it has been assumed that if the regulator pins were moved, the isochronous adjustment and the position adjustment of the hairspring would be lost.

I have found the contrary to be true. I have discovered, that, by means of my novel device, the mean time rate of the horological instrument may be adjusted by moving the outer regulator pin of a pair thereof so as to effectuate a change in said mean time rate as great as 100 seconds per day, while the isochronous rate and/or the position rate is changed as little as 1 second a day.

In short, by means hereof, the mean time rate of the instrument may be drastically changed while only a slight change is effectuated in the isochronous and position rates of the instrument.

It will be understood that the mean time rate represents the optimum rate of all positions of the instrument. For example, a watch may run fast in the dial up position, while it may run slow in the pennant down position. By appropriate manipulation of the regulating device hereof, the optimum position of the regulator pins relative to the hairspring may be achieved regardless of the position of the watch and without unduly disturbing the isochronous and position rates of the instrument.

While the prior art discloses means for moving one of a pair of regulating pins into clamping position relative to the hairspring, none shows regulating means capable of effectuating extremely fine incremental adjustments in the space between the pins.

It is accordingly a primary object hereof to provide a novel regulator mechanism which will enable more exact and positive adjustments to be made and to be maintained in the timing of a watch than have been possible with known regulating mechanisms as exemplified by the prior art, and without the necessity of removing the balance bridge, the hairspring and adjunctive parts.

It will be understood that the regulator mechanism hereof may be suitably modified whereby movement of both regulating pins may be effectuated if desired.

The characteristic features which I consider to be novel with my invention, as to its construction and organization and as to its method of operation, will be better understood from a consideration of the following detailed description forming part of this specification, when read in conjunction with the illustrations in the accompanying drawings, wherein like characters of reference are employed to designate like or corresponding parts throughout the several views and in which:

FIG. 3 is a top plan view of a modified form of the regulating device of my invention;

FIG. 4 is a front elevational view of the regulating device shown in FIG. 3;

FIG. 5 is a front elevational view of the eccentric adjustment device shown in FIGS. 3 and 4;

Figure 1:
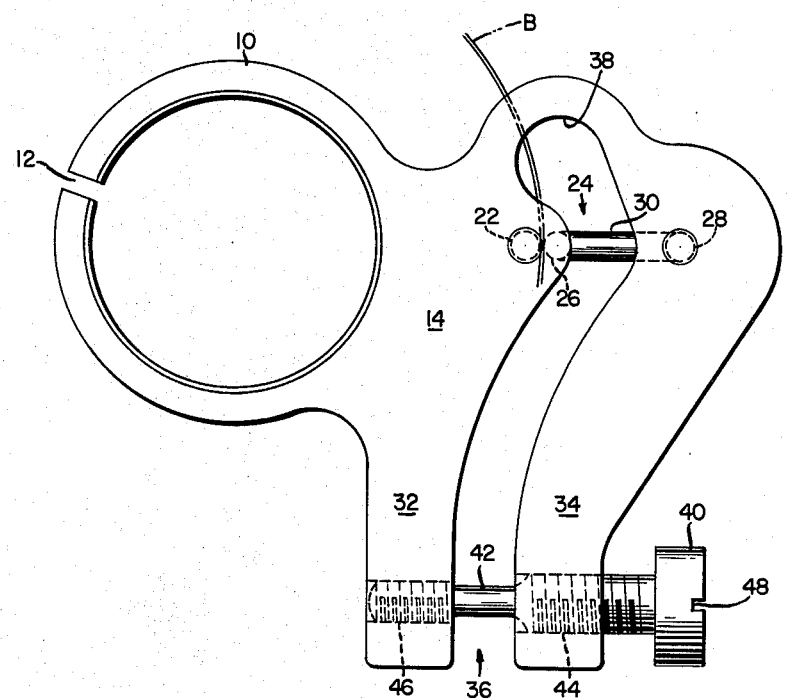
FIG. 1 is a top plan view of a preferred embodiment of a regulating device embodying my invention.

In the drawings, I have not disclosed the related components of a horological instrument. However, it will be understood that the regulating device hereof will be disposed in the usual manner relative to the index disc and balance bridge of such an instrument, with the regulating or curb pins of the regulating device being disposed adjacent the spiral balance hairspring and balance wheel of the instrument, all as is known in the art.

If desired, the regulating device hereof may be provided with an indicator arm which will overlie appropriate adjustment indicia etched into or otherwise delineated upon the balance bridge, with the arm being readily accessible for manual rotation and consequent indexing or regulating.

The friction between the index disc and the regulating device hereof will be such as to permit oscillation of the regulating device and indicator arm without moving or affecting the index disc, although upon movement of the index disc in one direction or the other, the regulating device and indicator arm will necessarily be moved therewith, unless held against such movement by the holding of the indicator arm.

When the regulating device is oscillated, it will be appreciated that the effective length of the balance hairspring is changed so that the timing of the watch is changed.

The spiral balance hairspring, shown in phantom in the drawings, will be disposed beneath the balance bridge of the instrument and will have its inner end fixed to the balance staff and its outer end fixed to the balance bridge is known manner.

Figure 2:
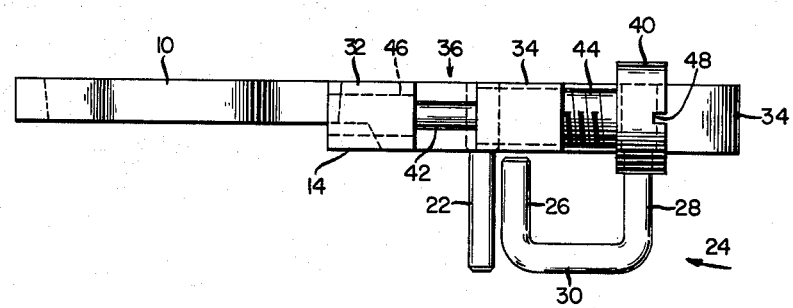
FIG. 2 is a front elevational view of the regulating device shown in FIG. 1.

In the preferred embodiment of the invention shown in FIGS. 1 and 2, I have shown a regulating device comprising a regulator ring 10, split at 12 as shown, and having an arm 14 extending radially outwardly therefrom at one side and coplanar with the main plane thereof.

The regulator pins are fixed to and depend from the lower planar surface of arm 14, the inner pin 22 being of conventional pin-like configuration and the outer pin comprising the free-ended, upstanding arm 26 of a generally U-shaped pin, generally indicated by 24, having one upstanding arm 28 fixed at its upper end to arm 14, the said arms 26 and 28 being disposed in generally parallel relationship as to each other and being interconnected at their lowermost extremities by a transversely-extending arm 30.

It will hereby be explained that the inner pin 22 could likewise be of the same U-shaped configuration.

By such arrangement, the inner regulator pin 22 and the outer regulator arm 26 may be disposed in spaced relationship as to each other wherefore the outermost convolution of a hairspring B may be disposed in the plane of, and in the space provided between, the regulator pins.

As in FIG. 2, it will be appreciated that the outer regulator arm 26 may be readily moved relative to the inner regulator pin 22 in the adjustment procedures subsequently to be outlined all in the process of controlling the speed at which the time piece operates.

Arm 14 will be observed to comprise a pair of coplanar inner and outer portions 32 and 34 respectively, separated and spaced from each other by means of the slotting of said arm 14 inwardly from one side thereof toward its opposite side in manner to provide an elongated slot 36 terminating at its inner extremity in a pivot opening 38 communicating therewith, as shown.

The transversely-extending arm 30 of U-shaped pin 24 will be observed to extend transversely of slot 36 in a plane vertically therebelow wherefore arm 26 will be disposed adjacent pin 22 in spaced relationship therewith, as aforesaid.

A transversely-extending differential screw 40 is threadedly engaged in suitably aligned and threaded transversely-extending openings extending through the inner and outer portions 32 and 34 respectively, the shank 42 of said screw having an outermost end portion 44 of a certain thread, say 150 threads per inch, and an innermost end portion 46 of a different thread, say 170 threads per inch. By providing such a screw, it requires a considerable angle of rotation of the screw to move the inner and outer portions relative to each other.

The head of differential screw 40 will be slotted as at 48 for facilitating the rotation thereof by a suitable tool in manner whereby minute changes in the relative spacing between the inner and outer portions 32 and 34 respectively may be effectuated to the end that a corresponding adjustment laterally of the spacing between the pin 22 and the arm 26 is effectuated.

In practice, where the outermost end portion 44 of the shank of screw 40 may be provided with 150 threads per inch and where the innermost end portion 46 thereof may be provided with 170 threads per inch, it will be appreciated that a lead of .001″ per turn of the said screw will provide a lateral movement of approximately .0026″ of movable arm 26 relative to fixed pin 22.

It will of course be understood that these figures are purely illustrative and that the differential screw may be threaded to meet varying adjustment desiderata.

By the employment of the U-shaped pin 24 in lieu of a single outer regulator pin, a wide range of radial and vertical adjustments may be made in the positioning of arm 26 relative to pin 22, all so as to offer a greater range of positions of said arm 26 relative to the hair spring.

I have shown, in FIGS. 3–5 a modified form of the invention comprising a split regulator ring 110 having an arm 114 extending radially outwardly therefrom at one side and coplanar with the main plane thereof.

As in the case of the form of FIGS. 1 and 2, inner pin 122 is fixed to and depends from the lower planar surface of inner portion 132 of arm 114 and a U-shaped pin, generally indicated by 124, has an upstanding arm 128 fixed at its upper end to outer portion 134, a free-ended upstanding arm 126 serving as the outer pin, and an interconnecting transversely-extending arm 130, pins 122 and 126 being spaced as to each other in parallelism with the outer convolution of a hairspring B′ passing therebetween.

Arm 114 is provided with a slot 136 extending inwardly from one side thereof toward its opposite side and terminating at its inner extremity in a pivot opening 138 communicating therewith, as shown, wherefore the said inner and outer portions 132 and 134 respectively are provided.

Inner portion 132 is provided adjacent one side thereof with a vertically-extending opening 150 which extends therethrough and into which a stud 152, slotted at its uppermost end at 154 may be inserted.

Stud 152 is provided with an outwardly-extending annular flange or skirt 156, having adjustment indicia 158 delineated upon the upwardly facing surface thereof, which skirt is of a dimension to overlie the upper planar face of the inner portion 132. Stud 152 may be manually rotated by means of a tool inserted in slot 154, so as to bring indicia 158 on skirt 156 into suitable registration with a complemental registration mark 160 delineated on said inner portion 132.

The shank of stud 152 will be provided with an annular eccentric or cam groove 162, which groove will be alignable with a transversely-extending opening 164 provided in inner portion 132 and extending inwardly from slot 136 to communicate with opening 150.

A drag pin 166 is nested within opening 164 so that its inner end 168 may ride in cam groove 162 and its outer end 170 may extend outwardly into slot 136 so as to contact the oppositely facing inner edge of outer portion 134.

In operational use, a screwdriver or like tool may be inserted into slot 154 in the head of stud 152 for the rotation of same, as aforesaid, whereby cam groove 162 is rotated simultaneously therewith with a resultant actuation of drag pin 166 either toward or away from outer portion 134 and a consequent movement of said outer portion and a concomitant movement of pin 126 toward or away from pin 122.

Such construction offers the advantage that the friction or drag of cam groove 162 as stud 152 is rotated is against drag pin 166 and is confined within opening 164, with no friction being set up between cam groove 162 and the outer portion 134, thus virtually eliminating adjustment error and greatly reducing the possibility of excessive wear of stud 152 and/or of outer portion 134.

Figure 6:
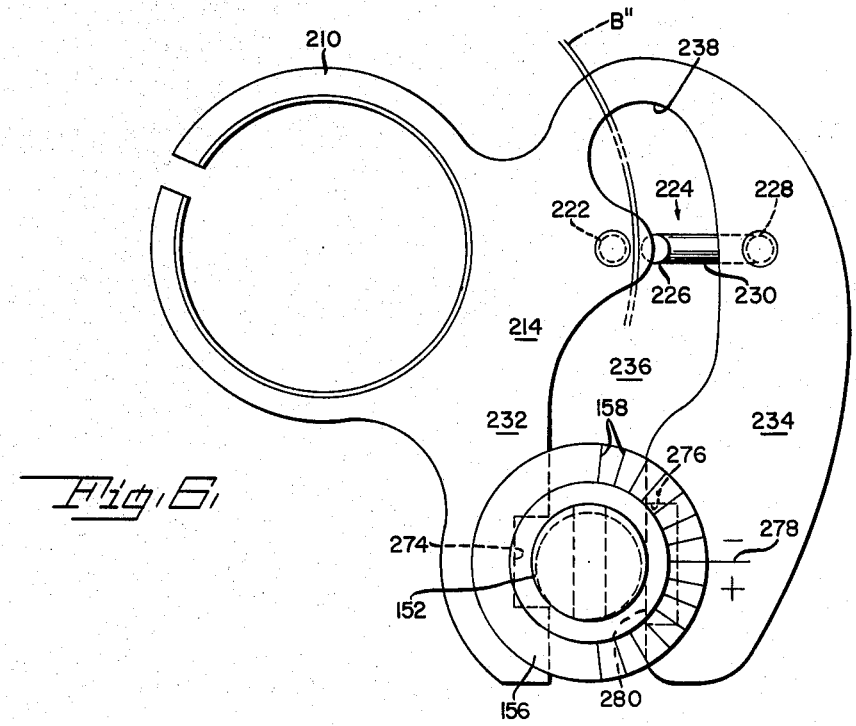
FIG. 6 is a top plan view of another modified form of the regulating device of my invention.
Figure 7:
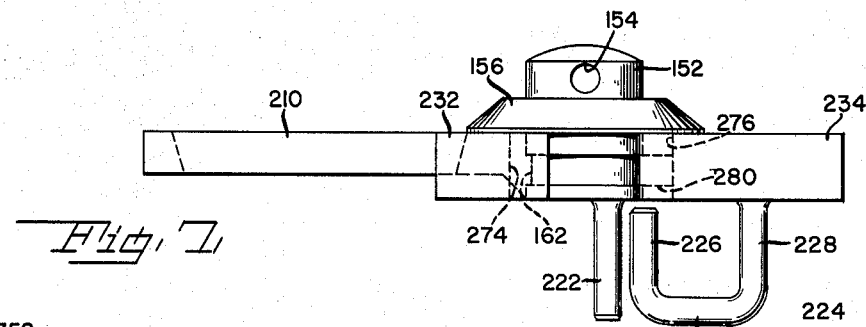
FIG. 7 is a front elevational view of the regulating device shown in FIG. 6.

In another embodiment of my invention, I have shown, in FIGS. 6 and 7, a regulating device comprising a split regulator ring 210 having an arm 214 extending radially outwardly therefrom at one side and coplanar with the main plane thereof.

As in the case of FIGS. 1 through 4, inner pin 222 is fixed to and depends from the lower planar surface of inner portion 232 of arm 214 and a U-shaped pin generally indicated by 224, has an upstanding arm 228 fixed at its upper end to outer portion 234, and a free-ended upstanding arm 226 serving as the outer pin, and an interconnecting transversely-extending arm 230, arms 222 and 226 being spaced as to each other in parallelism with the outer convolution of a hair spring B″ passing therebetween.

Arm 214 is provided with a slot 236 extending inwardly from one side thereof toward its opposite side and terminating at its inner extremity in a pivot opening 238 communicating therewith, as shown, wherefor said inner and outer portions 232 and 234 respectively are provided.

Inner and outer portions 232 and 234 are provided adjacent slot 236 with aligned, longitudinally extending recesses 274 and 276 respectively, which extend in opposite directions from slot 236.

Stud 152, slotted as at 154, is insertable into slot 236 intermediate the aligned recesses 274 and 276.

Outer portion 234 is provided with registration mark 278 with which the indicia 158 delineated on the annular flange or skirt 156 may register upon rotation thereof.

A pallet jewel 280 is receivable in recess 276 in outer portion 234 and will be secured therein as by cement or other suitable means.

Jewel 280 will be of appropriate size to be receivable in cam groove 162 of stud 152 wherefor, as the stud is rotated, the pallet jewel will bear against the cam groove to move outer portion 234 toward and away from inner portion 232.

Such construction offers the advantage of reducing the friction which would otherwise result between the cam and outer portion 234.

Figures 8, 9:
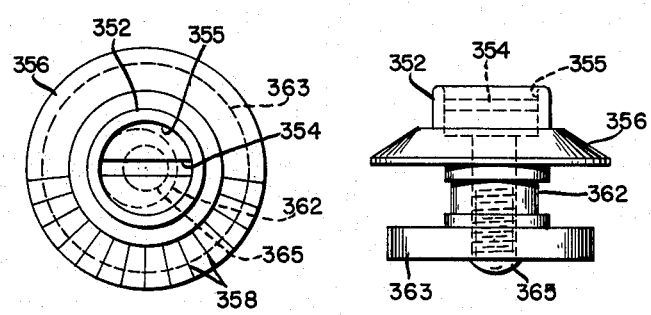
FIGS. 8 and 9 are top plan and front elevational views respectively of a modified form of the eccentric adjustment means of my invention.

In FIGS. 8 and 9, I have illustrated a modified form of a stud showing stud 352 having a slot 354 seated within an annular recess 355, an annular flange or skirt 356 having adjustment indicia 358 delineated thereon and a shank provided with an annular eccentric or cam groove 362.

A retaining disc 363 is fixed to the lower end of the shank of stud 352 as by an upwardly extending screw 365 threaded into said shank.

Retaining disc 363 will preclude any accidental upward movement of the stud relative to the arm of the regulating device with which the stud may be employed, while the recessed slotted head will permit the holding of a screw driver or other adjustment tool in position and preclude any objectionable slipping thereof.

It is believed that the gist of the invention will be clearly understood from the foregoing disclosure, with further analysis thereof being unnecessary. The substitution of equivalents and other changes, modifications and alterations as circumstances may suggest or render expedient, are reasonably contemplated, the invention being susceptible of such without departing from its real spirit or underlying principles.

I particularly point out and distinctly claim as my invention:

1. In a regulator mechanism for adjusting the mean time rate of a time keeping device inclusive of a convoluted balance spring for effecting oscillation of a balance wheel relative to a balance cock comprising, regulator means including an annular split ring frictionally engageable with and pivotable about the balance cock during major adjustment of the split ring-balance cock relationship and an arm connected to the split ring of said means at a point of jointure and extending radially outwardly therefrom, the arm of said regulator means including inner and outer half-portions separated and spaced from each other by an open-ended slot terminating in a pivot-opening at its inner extremity at the point of jointure, an inner regulating pin depending from the inner half-portion of the arm of said regulator means adjacent the pivot-opening, an outer regulating pin depending from the outer half-portion of the arm of said regulator means adjacent the pivot-opening, said inner and outer regulating pins being disposed in the plane of and on opposite faces of a convolution of the balance spring, and adjustment means supported by and rotatable relative to the arm of said regulator means adjacent the outer extremity of the open-ended slot and at a point removed from the pivot opening with the outer half-portion of the arm of said regulator means being biasable relative to the inner half-portion for effectuating incrementally fine movements of said outer regulating pin relative to said inner regulating pin.

2. In a regulator mechanism for adjusting the mean time rate of a time keeping device inclusive of a coil spring for the oscillation of a balance wheel relative to a balance cock, the combination of, a regulator constituted by an annular ring engageable with and pivotable about the balance cock and an arm extending radially outwardly of and connected to the ring at a point of jointure, the arm of said regulator including coplanar inner and outer half-portions separated from each other in spaced relationship by a longitudinally extending open-ended arm slot terminating at its inner end adjacent a fulcrum of the arm of said regulator, an inner regulating pin supported by and depending from one of said half-portions adjacent the fulcrum and an outer regulating pin supported by and depending from the other of said half-portions adjacent the fulcrum, said regulating pins being disposed in the plane of and adjacent opposite faces of a convolution of the coil spring, and adjustment means supported by the arm of said regulator adjacent the open end of the arm slot at a point removed from the fulcrum whereby one of said half-portions may be swung inwardly and outwardly relative to the other of said half-portions upon the fulcrum in incrementally fine movement for effectuating concomitant movement of said outer regulating pin relative to said inner regulating pin.

3. In the regulator mechanism as set forth in claim 2, said adjustment means comprising a transversely-extending differential screw with a shank of a certain thread threadedly engaged with and movable relative to one of said half-portions and a shank of a different thread threadedly engaged with and movable relative to the other of said half-portions.

References Cited by the Examiner

FOREIGN PATENTS

| | | |
|---|---|---|
| 432,596 | 8/1926 | Germany. |
| 18,539 | 1/1899 | Switzerland. |

OTHER REFERENCES

De Carle, Donald: Watch and Clock Encyclopedia, N.A.G. Press, Ltd., London 1959, pp. 245–247.

Glasgow, David: Watch and Clock Making, Cassell & Company, Ltd., London, 1885, p. 211.

Milham, Willis I.; Time and Timekeepers, The Macmillan Company, New York, 1923, pp. 118, 119.

LEO SMILOW, *Primary Examiner.*

JOSEPH P. STRIZAK, LEYLAND M. MARTIN, *Examiners.*

G. F. BAKER, *Assistant Examiner.*